United States Patent [19]

Smith et al.

[11] Patent Number: 4,741,904

[45] Date of Patent: * May 3, 1988

[54] LONG LIFE SEMI-ARTIFICIAL WATER BORNE FEED

[75] Inventors: Malcolm S. Smith, Beaumont; Colastie J. Daigle, Orange, both of Tex.

[73] Assignee: E. I. Du Pont de Nemours and Company, Wilmington, Del.

[ * ] Notice: The portion of the term of this patent subsequent to Mar. 18, 2003 has been disclaimed.

[21] Appl. No.: 24,171

[22] Filed: Mar. 10, 1987

Related U.S. Application Data

[63] Continuation-in-part of Ser. No. 838,635, Mar. 6, 1986, Pat. No. 4,666,717, which is a continuation-in-part of Ser. No. 754,156, Jul. 12, 1985, Pat. No. 4,576,821.

[51] Int. Cl.$^4$ .................. A23L 1/325; A01K 85/00
[52] U.S. Cl. ........................................ 426/1; 43/44.99
[58] Field of Search .................. 426/1; 43/44.99; 523/102

[56] References Cited

U.S. PATENT DOCUMENTS

| | | | |
|---|---|---|---|
| 1,185,894 | 6/1916 | Evans | 426/1 |
| 2,979,778 | 4/1961 | Fitz Simons | 18/58 |
| 3,410,689 | 11/1968 | Nathan | 99/3 |
| 3,579,895 | 5/1971 | Orn | 43/17.6 |
| 3,684,519 | 8/1972 | Combs | 99/3 |
| 3,846,931 | 11/1974 | Block et al. | 43/42.53 |
| 3,875,302 | 4/1975 | Inoue | 426/1 |
| 4,202,905 | 5/1980 | Asai et al. | 426/1 |
| 4,245,420 | 1/1981 | Carr | 43/42.06 |
| 4,463,018 | 7/1984 | Carr | 426/1 |
| 4,513,657 | 4/1985 | Melancon | 99/472 |

FOREIGN PATENT DOCUMENTS 0137748 4/1985 European Pat. Off. .

*Primary Examiner*—George Yeung

[57] ABSTRACT

A composition useful as fish and crustacean feed consisting essentially of (a) from about 0.5 to 10 weight percent of a water insoluble polymer having a melting point below about 110° C., selected from the group consisting of polyamides and copolymers of ethylene with from about 15 to about 45 weight percent of at least one ethylenically unsaturated comonomer;

(b) from about 75 to about 95 weight percent of a nutrient medium selected from the group consisting of fish meal, crustacea meal, grain derived products, plant derived products, animal derived products, and fish by-products;

(c) from 0 to about 20 weight percent of a lubricant selected from the group consisting of edible oil and fish solid solubles;

(d) from 0 to about 10 weight percent of a vitamin and mineral concentrate;

(e) from 0 to about 10 weight percent of a preservative.

6 Claims, No Drawings

LONG LIFE SEMI-ARTIFICIAL WATER BORNE FEED

RELATION TO OTHER APPLICATIONS

This application is a continuation-in-part of Ser. No. 838,635, filed Mar. 6, 1986, now U.S. Pat. No. 4,666,717, which in turn is a continuation-in-part of Ser. No. 754,156, filed July 12, 1985, now U.S. Pat. No. 4,576,821.

BACKGROUND OF THE INVENTION

This invention relates to a composition useful as crustacean and fish feed, and more particularly it relates to long life semi-artificial feeds containing polymer, fish meal, crustacea derived meals, plant derived particulates, and oils and by-products from these products.

DESCRIPTION OF THE PRIOR ART

Crustacea, such as prawns, lobster, shrimp, etc., and fish are raised commercially and fed with nutrients derived from a wide variety of products such as fish and fish by-products, crustacea meals, animal slaughterhouse products, grains and plant derived products including oils, and milk and milk by-products. Many commercial feeds do not retain their integrity in water for a satisfactory period of time, but dissolve before the crustacea or fish can consume the feed.

Numerous commercial feeds are available. They consist essentially of animal and grain products chosen to give a desired level of protein to maximize growth in a specific species. They are held together by a water soluble natural based binder. Feeds of this type dissolve rapidly as the small pellets are cast into the water. Feeds are expensive and represent a significant expense in the raising of crustacea and fish.

A need exists for a water-borne feed capable of retaining its integrity in water for an extended period of time, on the order of several hours, to allow the target species to find and consume the feed.

SUMMARY OF THE INVENTION

According to the present invention, there is provided a composition useful as fish and crustacean feed consisting essentially of (a) from about 0.5 to about 10 weight percent of a water insoluble polymer having a melting point below about 110° C. selected from the group consisting of polyamides and copolymers of ethylene with from about 15 to about 45 weight percent of at least one ethylenically unsaturated comonomer;

(b) from about 75 to about 95 weight percent of a nutrient selected from the group consisting of fish meal, crustacea meal, grain and plant derived products, animal derived products, and fish by-products;

(c) from 0 to about 10 weight percent of a lubricant selected from the group consisting of edible oil and fish solid solubles;

(d) from 0 to about 10 weight percent of a vitamin and mineral concentrate;

(e) from 0 to about 10 weight percent of a preservative.

DETAILED DESCRIPTION OF THE INVENTION

It has been found that certain polymers act as a water resistant binder when added to fish and crustacea feed formulations to give these feeds improved physical integrity when exposed to water.

Suitable polymers have the common characteristics of being relatively soft, low melting, water insoluble, and able to accept high filler loadings, such as fish or plant derived products and oil, while retaining satisfactory physical strength properties. The polymers must further be soft enough and effective at low concentrations to permit the crustacea or fish to consume the feed, yet strong enough to remain substantially intact over a sufficiently long period of time. Since the feed is best made by an extrusion process, the polymer must melt and be processable at a low enough temperature (about 90°–110° C.) such that the feed components will not be degraded during the processing.

Thus suitable polymers are water insoluble polymers having a melting point below about 110° C. selected from the group consisting of polyamides and copolymers of ethylene with at least one ethylenically unsaturated comonomer. Examples of such polymers are ethylene/n-butyl acrylate/carbon monoxide (E/n-BA/CO), ethylene/methacrylic acid (E/MAA), E/-BA/MAA, E/BA/GMA (glycidyl methacrylate), E/-MAA/VA (vinyl acetate), E/VA/CO, and E/iBA (isobutylacrylate)/MAA, and polyamides, such a as "Macromelt" 6301 hot melt adhesive available from Hendel Corporation.

Generally the ethylenically unsaturated comonomer in the ethylene copolymer is present in an amount of from about 15 to about 45 weight percent. Increasing the amount of ethylenically unsaturated comonomers in a given ethylene copolymer increases its melting point, decreases solubility of the nutrient, and increase the hardness of the composition. A compromise of these properties is necessary in the various polymers to produce acceptable feed.

Preferably the ethylenically unsaturated comonomer is present in an amount of from about 20 to about 40 weight percent, and most preferably from about 25 to about 35 weight percent.

The most preferred ethylene copolymer is ethylene/vinyl acetate.

The amount of polymer in the feed of the present invention is from about 0.5 to about 10 weight percent, and preferably from about 2 to about 5 weight percent.

The second essential ingredient is a nutrient medium prepared from animal or plant products. Common nutrients include fish meal, powdered fish, crab or other crustacea meal, meat scrap, milk solids, blood meal, grain flour (wheat flour, corn flour, etc.), soybean meal, algae meal, dried yeast, and numerous animal and plant by-products which are well-known to the person skilled in the art.

The amount of nutrient medium in the feed of the present invention should be from about 75 to about 95 weight percent, and preferably from about 80 to about 90 weight percent.

Optionally, additional amounts of a lubricant may be used, selected from the group consisting of edible oils and fish solid solubles. The edible oils are considered to be any oils which are not harmful to the fish or crustacean consuming the feed, and preferably are oils which can be digested. Examples of these preferred oil include fish oil, vegetable oil (such as corn oil, peanut oil, cotton seed oil). Fish solid solubles is a by-product from the preparation of fish meal. It represents the water soluble part of the whole fish, and is normally largely removed during the preparation of fish meal. However, fish meal will normally still contain a certain amount of fish oil and fish solid solubles. Supplemental amounts of this type of lubricant may be required to be added to the nutrient medium, in order to aid in processing, when the nutrient medium is too "dry." It is well within the skill of one skilled in the art to determine when additional lubricant is needed.

The amount of added lubricant may be between 0 and about 20 weight percent, preferably between 0 and about 10 weight percent.

Optionally up to about 10 weight percent of a vitamin and mineral concentrate may be added. The vitamins may be either synthetic or derived from natural sources. A variety of vitamins and/or minerals may be added to the composition, the specific vitamins an mineral being determined by the particular nutritional characteristics of the other feed components and by the nutritional requirements of the species consuming the feed. Thus in some cases some selected vitamins may be added, in other cases certain selected minerals may be added, in some cases a full spectrum vitamin and mineral supplement may be desirable, while in other cases no supplement at all may be necessary. The concentrate may, of course, contain inert non-vitamin material, as is common with commercial vitamin and mineral concentrates.

Furthermore, optionally up to about 10 weight percent of a preservative may be added. Examples of preservatives would include mold inhibitors, antioxidants, and other additives known to those skilled in the art.

The composition of the present invention is suitable for feeding crab, shrimp, crawfish, lobster, and other crustacea, and fish. The semi-artificial feed of the present invention is unique in its ability to retain its integrity for several hours after being cast into the water. Most commercial baits dissolve rapidly under similar conditions. The present invention is rendered water resistant by the polymer component, resulting in a useful water life and improving the chance that the feed will be consumed. The composition may also be used as a bait.

The following examples serve to illustrate the present invention. All parts, percentages, and proportions are by weight unless otherwise indicated.

EXAMPLES

Compositions of polymer, nutrient medium, and optionally lubricant were dry blended by tumbling for about 15 minutes. This blend was fed to a 63.5 mm diameter extruder in which the breaker plate and screen pack were removed. A rapid compression screw was used, with a 20.6:1 length:diameter ratio, 1041 mm in length with a 267 mm mixing torpedo on the end. Melt temperature was maintained around 90°±10° C.

The blend was extruded through a heated 3.18 mm die to produce a continuous rope which was cut into 10 mm long pellets.

The shrimp feed was supplied by People's Moss Gin Co. of Palmetto, La.

EXAMPLE 1

Compositions containing 3% and 5% EVA (33% VA, melt index 43), and the remainder being shrimp feed, were prepared. Water absorption and integrity of the compositions were tested. The same properties were also tested for a control sample consisting of the same ingredients as were blended with the EVA, but employing only a milo-based binder and masonex, a wood-based binder.

Both compositions were soaked underwater to determine durability. After 24 hours, the 5% EVA sample remained essentially whole. The 3% EVA composition swelled to about twice its original diameter, but remained in recognizable pellet form. The control sample lost all integrity in under 1 hour.

Water absorption was tested by soaking pellets in distilled water for 4 hours and determining water absorbed as a fraction of pellet dry weight. The 5% EVA pellets absorbed 82 weight percent water, and the 3% pellets absorbed 112 weight percent water. The collected fragments of the badly deteriorated control had absorbed 584 weight percent water.

EXAMPLES 2-4 AND COMPARATIVE EXAMPLES C1-C4

The following experiments were run to determine the effect of copolymer level on processability and product integrity under water. In each of the following examples the copolymer was a copolymer of ethylene with 40% vinyl acetate, and the nutrient medium consisted of the following composition:

| | | |
|---|---|---|
| soybean meal | 50% | |
| fish meal | 19% | |
| corn meal | 20% | |
| rice bran | 10% | |
| vitamin concentrate | 1% | |

| Example | Nutrient % | Copolymer % | Fish Solid Solubles, % |
|---|---|---|---|
| C1 | 90 | 5 | 5 |
| 2 | 83 | 5 | 12 |
| 3 | 83 | 2 | 15 |
| 4 | 83 | 0.8 | 16.2 |
| C2 | 83 | 0.4 | 16.6 |
| C3 | 83 | 0.2 | 16.8 |
| C4 | 83 | 0 | 17 |

These compositions were extruded through a 3.18 mm die at 5-10 rpm, using a pressure of 1900-2400 psi (13-16.5 MPa). Extruder temperature was attempted to be maintained at 90°-100° C. The actual temperatures are shown below:

| Example | Temperature (°C.) | Comments |
|---|---|---|
| C1 | 140 | too dry; overheated. more lubricant needed |
| 2 | 91 | |
| 3 | 104 | |
| 4 | 92 | difficult to feed |
| C2 | 95 | difficult to feed |
| C3 | 90 | difficult to feed |
| C4 | 110 | difficult to feed |

Pellets prepared from these compositions were tested for stability in water by stirring in water for 1 hour. The remaining solids were collected on a 20 mesh (0.08 mm) screen and dried. The dry weight remaining is expressed below as a percent of the original dry weight. Even under the rigorous conditions of this test, the feed compositions show significant stability.

| Example | % Recovered |
|---|---|
| 2 | 24.5 |
| 3 | 37.7 |
| 4 | 44 |
| C2 | 45 |
| C3 | 64 |

-continued

| Example | % Recovered |
| --- | --- |
| C4 | 63 |

We claim:

1. A composition useful as fish and crustacean feed consisting essentially of
   (a) from about 0.5 to about 10 weight percent of a water insoluble polymer having a melting point below about 110° C., selected from the group consisting of polyamides and copolymers of ethylene with from about 15 to about 45 weight percent of at least one ethylenically unsaturated comonomer;
   (b) from about 75 to about 95 weight percent of a nutrient medium selected from the group consisting of fish meal, crustacea meal, grain derived products, plant derived products, animal derived products, and fish by-products;
   (c) from 0 to about 20 weight percent of a lubricant selected from the group consisting of edible oil and fish solid solubles;
   (d) from 0 to about 10 weight percent of a vitamin and mineral concentrate;
   (e) from 0 to about 10 weight percent of a preservative.

2. The composition of claim 1 wherein the polymer is a copolymer of ethylene selected from the group consisting of ethylene/vinyl acetate, ethylene/n-butyl acrylate/carbon monoxide, ethylene/n-butyl acrylate/methacrylic acid, ethylene/n-butyl acrylate/glycidyl methacrylate, ethylene/methacrylic acid/vinyl acetate, ethylene/methacrylic acid, ethylene/i-butyl acrylate/methacrylic acid, and ethylene/vinyl acetate/carbon monoxide.

3. The composition of claim 2 wherein the amount of lubricant is from about 10 to about 17 weight percent.

4. The composition of claim 2 wherein the comonomer in the ethylene copolymer is present in an amount of from about 20 to about 40 weight percent.

5. The composition of claim 1 wherein the polymer is present in an amount of from about 2 to about 5 weight percent.

6. The composition of claim 2 wherein the copolymer is ethylene/vinyl acetate.

* * * * *